United States Patent
Lin et al.

(10) Patent No.: US 11,285,401 B2
(45) Date of Patent: Mar. 29, 2022

(54) ATMOSPHERIC WATER GENERATOR FOR EXTRACTING WATER DROPLETS FROM AMBIENT AIR

(71) Applicant: NATIONAL CHIAO TUNG UNIVERSITY, Hsinchu (TW)

(72) Inventors: Yi-Hsin Lin, Zhubei (TW); Chia-Ming Chang, Hsinchu (TW)

(73) Assignee: NATIONAL CHIAO TUNG UNIVERSITY, Hsinchu (TW)

(*) Notice: Subject to any disclaimer, the term of this patent is extended or adjusted under 35 U.S.C. 154(b) by 647 days.

(21) Appl. No.: 16/250,041

(22) Filed: Jan. 17, 2019

(65) Prior Publication Data
US 2020/0147514 A1    May 14, 2020

(30) Foreign Application Priority Data

Nov. 12, 2018 (TW) .................................. 107140056

(51) Int. Cl.
*B01D 5/00* (2006.01)
*B01D 53/26* (2006.01)
(Continued)

(52) U.S. Cl.
CPC ........... *B01D 5/009* (2013.01); *B01D 53/265* (2013.01); *C09K 19/20* (2013.01); *C09K 19/56* (2013.01); *E03B 3/28* (2013.01); *F28F 19/04* (2013.01); *H01M 8/04119* (2013.01); *H01M 8/04126* (2013.01); *H01M 8/04156* (2013.01); *H01M 8/04171* (2013.01); *H01M 8/04492* (2013.01); *H01M 8/04544* (2013.01); *H01M 50/489* (2021.01); *F28F 2245/02* (2013.01); *F28F 2245/04* (2013.01); *F28F 2255/06* (2013.01); *H01M 8/04186* (2013.01)

(58) Field of Classification Search
None
See application file for complete search history.

(56) References Cited

U.S. PATENT DOCUMENTS

2014/0147627 A1* 5/2014 Aizenberg ............ B01L 3/5027
                                                        428/141

FOREIGN PATENT DOCUMENTS

| TW | 200842350 A | * | 11/2008 |
| TW | 201205072 A1 | | 2/2012 |
| WO | 2006028287 A1 | | 3/2006 |

OTHER PUBLICATIONS

Translation of TW200842350A, accessed Oct. 7, 2021 (Year: 2008).*
(Continued)

*Primary Examiner* — Christopher P Jones
*Assistant Examiner* — Phillip Y Shao

(57) ABSTRACT

An atmospheric water generator for extracting water droplets from ambient air includes an insulating substrate, a plurality of electrode film units, and a liquid crystal/polymer composite film. Each of surface regions of the liquid crystal/polymer composite film has a plurality of liquid crystal molecules each having a hydrophilic functional group and a hydrophobic moiety. Each of the surface regions normally has one of hydrophilic and hydrophobic properties. When a voltage is applied to one of the electrode film units, the respective surface region is switched to have the other one of hydrophilic and hydrophobic properties, to thereby allow the water droplets condensed from the ambient air to move on the surface regions.

7 Claims, 4 Drawing Sheets

(51) Int. Cl.
*F28F 19/04* (2006.01)
*E03B 3/28* (2006.01)
*C09K 19/20* (2006.01)
*C09K 19/56* (2006.01)
*H01M 8/04492* (2016.01)
*H01M 8/04119* (2016.01)
*H01M 8/04537* (2016.01)
*H01M 50/489* (2021.01)
*H01M 8/04186* (2016.01)

(56) References Cited

OTHER PUBLICATIONS

Translation of applicant's prior art TW201205072A, accessed Oct. 7, 2021 (Year: 2012).*
H. Kim, et al., "Water harvesting from air with metal-organic frameworks powered by natural sunlight," Science 356 (6336), 430-434 (2017).
R. V. Wahlgren, "Atmospheric Water Vapour Processor Designs for Potable Water Production: a Review," Water Res. 35, 1-22 (2001).
M. Muselli, et al., "Dew water collector for potable water in Ajaccio," Atmos. Res. 64, 297-312(2002).
O. Clus, et al., "Study of dew water collection in humid tropical islands," J. Hydrol. 361, 159-171 (2008).
A. Lee, et al., "Water harvest via dewing," Langmuir 28,10183-10191 (2012).

* cited by examiner

ATMOSPHERIC WATER GENERATOR FOR EXTRACTING WATER DROPLETS FROM AMBIENT AIR

CROSS-REFERENCE TO RELATED APPLICATION

This application claims priority from Taiwanese invention patent application no. 107140056, filed on Nov. 12, 2018.

FIELD

The disclosure relates to a water extraction device, more particularly to an atmospheric water generator for extracting water droplets from ambient air.

BACKGROUND

An atmospheric water generator is used for extracting water from humid ambient air. In a conventional cooling condensation type atmospheric water generator, the water vapor in the air is cooled and condensed into water. In an alternative conventional atmospheric water generator, desiccants such as such as lithium chloride or lithium bromide are utilized to pull water from the air via hygroscopic processes, followed by removal of the desiccants to obtain the water. The above conventional atmospheric water generators require a significant input of energy for extraction of atmospheric water.

SUMMARY

An object of the disclosure is to provide a novel atmospheric water generator for extracting water droplets from ambient air.

According to the disclosure, an atmospheric water generator for extracting water droplets from ambient air includes an insulating substrate, a plurality of electrode film units, and a liquid crystal/polymer composite film. The insulating substrate has an upper surface which defines a plurality of electrode-forming regions that are displaced from each other. Each of the electrode-forming regions has a first zone, a second zone spaced apart from the first zone, and an intermediate zone disposed between the first and second zones. Each of the electrode film units is formed on a respective one of the electrode-forming regions, and includes a first electrode and a second electrode. The first electrode has a first base portion formed on the respective first zone, and a plurality of first finger electrode portions which are formed on the respective intermediate zone, and which are displaced from each other. Each of the first finger electrode portions extends from the first base portion toward the respective second zone. The second electrode is electrically isolated from the first electrode, and has a second base portion formed on the respective second zone, and a plurality of second finger electrode portions that are formed on the respective intermediate zone to alternate with the first finger electrode portions. Each of the second finger electrode portions extends from the second base portion toward the first base portion. The liquid crystal/polymer composite film is disposed to cover the electrode film units, and has a contact surface for exposure to the ambient air. The contact surface has a plurality of surface regions each of which is in position corresponding to one of the electrode film units, and each of which has a plurality of liquid crystal molecules each having a hydrophilic functional group and a hydrophobic moiety such that each of the surface regions is permitted to have one of hydrophilic and hydrophobic properties when the liquid crystal molecules are retained by a plurality of polymer grains in a first orientation, and such that when a voltage is applied between the first and second electrodes of one of the electrode film units to generate a fringing field, the liquid crystal molecules of the respective surface region are orientated in a second orientation by the fringing field to permit the respective surface region to be switched to have the other one of the hydrophilic and hydrophobic properties, to thereby allow the water droplets condensed from the ambient air to move on the contact surface.

BRIEF DESCRIPTION OF THE DRAWINGS

Other features and advantages of the disclosure will become apparent in the following detailed description of the embodiment (s) with reference to the accompanying drawings, in which.

DETAILED DESCRIPTION

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

It should be noted that the drawings, which are for illustrative purposes only, are not drawn to scale, and are not intended to represent the actual sizes or actual relative sizes of the components of an atmospheric water generator.

Figure 1:
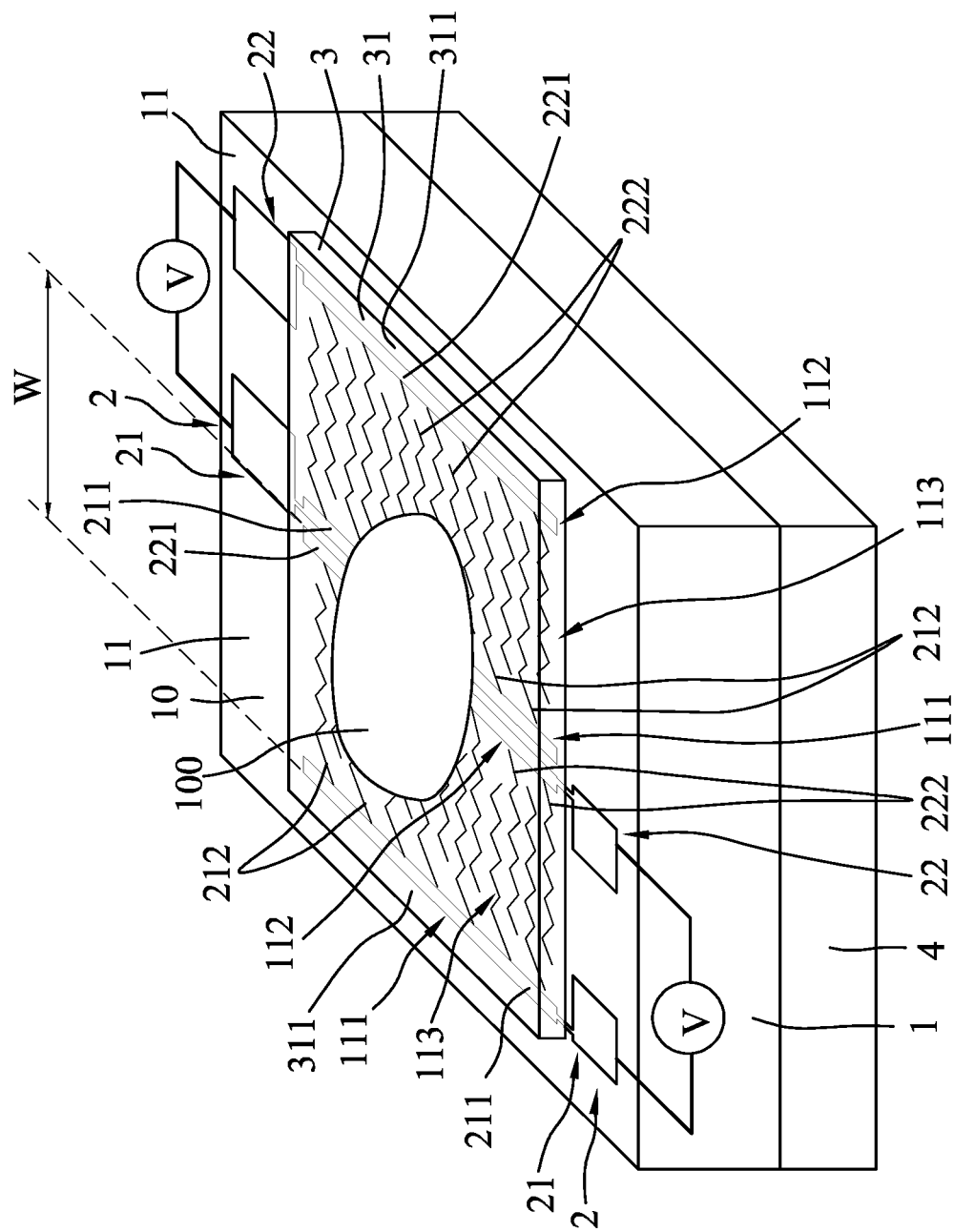
FIG. 1 is a schematic perspective view of an atmospheric water generator according to an embodiment of the disclosure.
Figure 2:
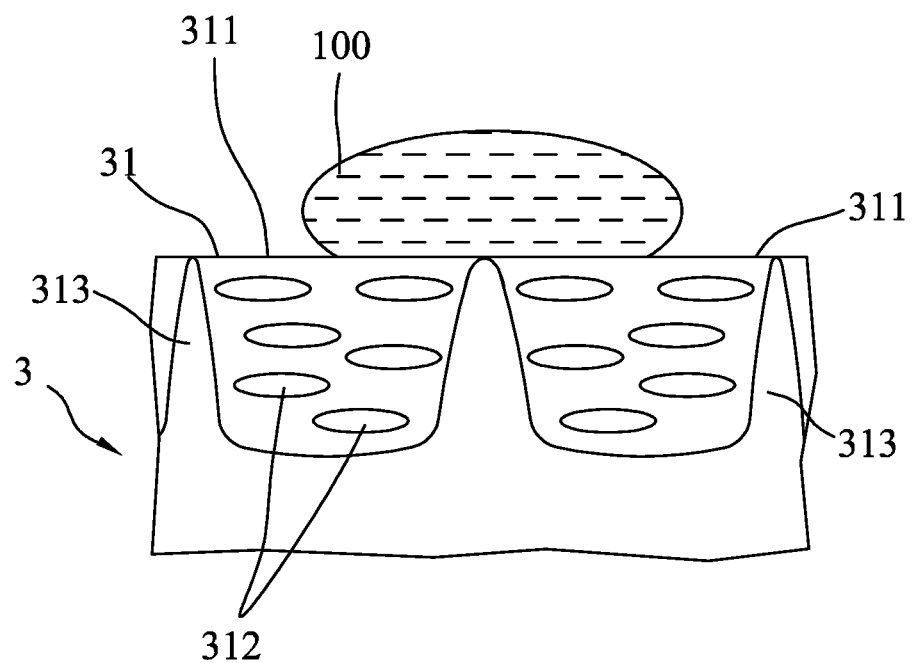
FIG. 2 is an enlarged schematic view illustrating liquid crystal molecules in the atmospheric water generator oriented in a first orientation.
Figure 3:
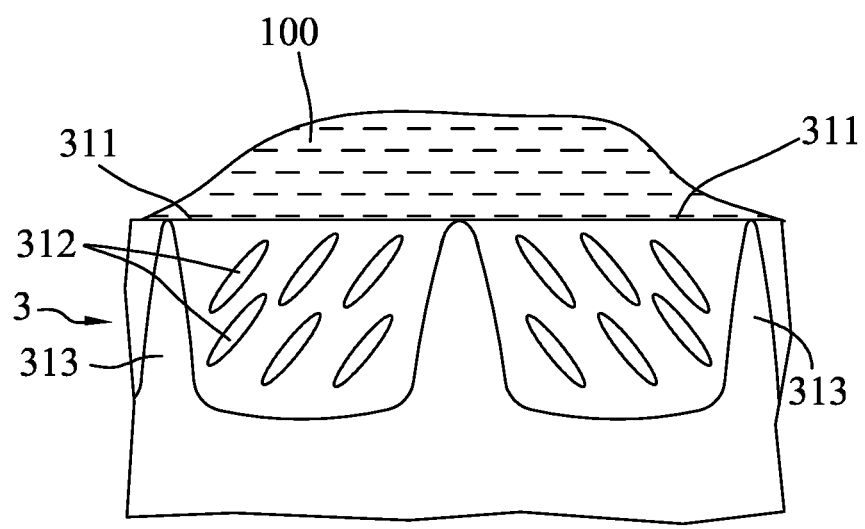
FIG. 3 is an enlarged schematic view illustrating the liquid crystal molecules in the atmospheric water generator oriented in a second orientation.

Referring to FIGS. 1 to 3, an atmospheric water generator for extracting water droplets 100 from ambient air is shown to include an insulating substrate 1, a plurality of electrode film units 2, and a liquid crystal/polymer composite film 3.

The insulating substrate 1 may be made from an insulating material, such as polymeric or glass materials, and has an upper surface 10 which defines a plurality of electrode-forming regions 11 that are displaced from each other. Each of the electrode-forming regions 11 has a first zone 111, a second zone 112 spaced apart from the first zone 111, and an intermediate zone 113 disposed between the first and second zones 111, 112.

Each of the electrode film units 2 is formed on a respective one of the electrode-forming regions 11, and includes a first electrode 21 and a second electrode 22. By applying a voltage between the first and second electrodes 21, 22 of one of the electrode film units 2, a fringing field is generated and applied to a corresponding region of the liquid crystal/polymer composite film 3.

In this embodiment, the first electrode 21 has a first base portion 211 which is formed on the respective first zone 111, and a plurality of first finger electrode portions 212 which are formed on the respective intermediate zone 113, and which are displaced from each other. Each of the first finger electrode portions 212 extends from the first base portion 211 toward the respective second zone 112. Each of the first finger electrode portions 212 may be configured as a zigzag stripe.

In one embodiment, each of the first finger electrode portions 212 may have a width ranging from 4 microns to 25 microns.

In another embodiment, each of the first finger electrode portions 212 may have a width ranging from 4 microns to 15 microns.

In yet another embodiment, each of the first finger electrode portions 212 may have a width ranging from 4 microns to 5 microns.

The second electrode 22 is electrically isolated from the first electrode 21, and has a second base portion 221 which is formed on the respective second zone 112, and a plurality of second finger electrode portions 222 which are formed on the respective intermediate zone 113 to alternate with the first finger electrode portions 212. Each of the second finger electrode portions 222 extends from the second base portion 221 toward the first base portion 211. The first and second finger electrode portions 212, 222 may have the same or different configuration.

In an embodiment shown in FIG. 1, each of the first and second finger electrode portions 212, 222 is configured as a zigzag stripe. The zigzag angle, as illustrated in FIG. 1, may be, but is not limited to, about 150°.

The liquid crystal/polymer composite film 3 is disposed to cover the electrode film units 2, and has a contact surface 31 for exposure to the ambient air. The contact surface 31 has a plurality of surface regions 311 each of which is in position corresponding to one of the electrode film units 2, and each of which has a plurality of liquid crystal molecules 312 each having a hydrophilic functional group and a hydrophobic moiety. Each of the surface regions 311 is permitted to have one of the hydrophilic and hydrophobic properties when the liquid crystal molecules 312 are retained by a plurality of polymer grains 313 in a first orientation (see FIG. 2). When a voltage is applied between the first and second electrodes 21, 22 of one of the electrode film units 2 to generate the fringing field, the liquid crystal molecules 312 of the respective surface region 311 are orientated in a second orientation (see FIG. 3) by the fringing field to permit the respective surface region 311 to be switched to have the other one of the hydrophilic and hydrophobic properties, to thereby allow the water droplets 100 condensed from the ambient air to move on the contact surface 31.

In an embodiment, the hydrophilic function group is a cyanide group, and the hydrophobic moiety includes a phenyl moiety. The liquid crystal molecules 312 are selected from the group consisting of 4-pentyl-4'-cyanobiphenyl, 4-heptyl-4'-cyanobiphenyl, 4-octyloxy-4'-cyanobiphenyl, 4-pentyl-4'-cyanoterphenyl, and combinations thereof.

Depending on the humidity or the temperature difference between day and night, a cooling device 4 may be optionally provided to enhance the working efficiency of the atmospheric water generator.

In an embodiment shown in FIG. 1, the cooling device 4 is disposed to cool the contact surface 31 below a dew point of water so as to facilitate condensation of water vapor in the ambient air into the water droplets 100 on at least one of the surface regions 311 with the hydrophilic property.

In an embodiment shown in FIG. 1, the cooling device 4 is mounted to a lower surface of the insulating substrate 1.

Figure 5:
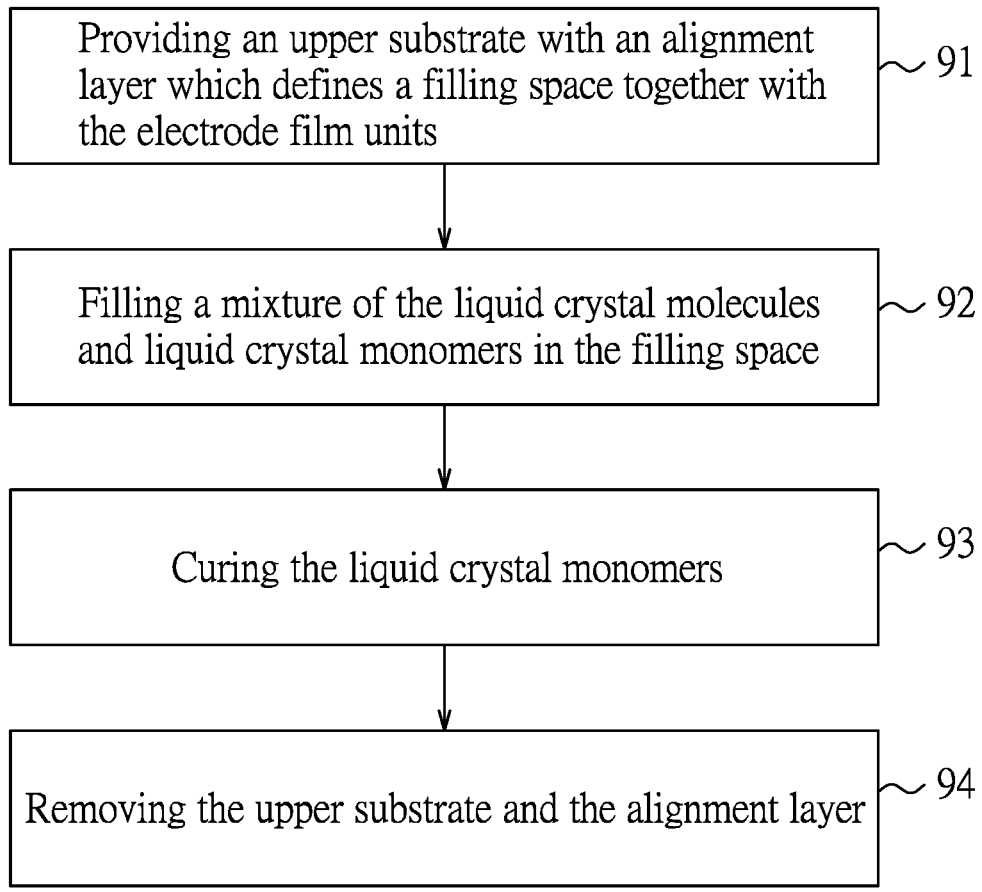
FIG. 5 is a flow chart illustrating a method for making a liquid crystal/polymer composite film of the atmospheric water generator.

The cooling device 4 may be any available cooling means, such as a coolant type cooling system, a device with a semiconductor cooling chip, a cooling panel, a circulation cooling system, etc. In an embodiment, the liquid crystal/polymer composite film 3 may be made by steps 91-94 shown in FIG. 5.

Figure 4:
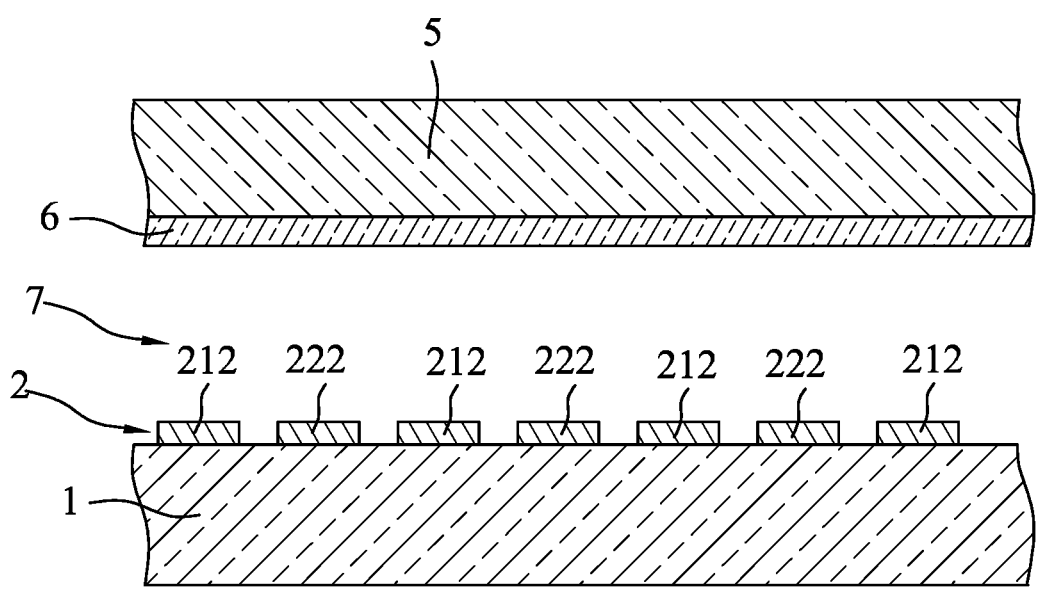
FIG. 4 is a schematic cross-sectional view illustrating a filling space between an alignment layer and electrode film units.

In step 91, an upper substrate 5 with an alignment layer 6 with a predetermined pattern is provided (see FIG. 4). The alignment layer 6 is spaced apart from the electrode film units 2 on the insulating substrate 1 to define a filling space 7 therebetween.

In step 92, a mixture of the liquid crystal molecules 312 and a liquid crystalline monomer is filled in the filling space 7 to permit the liquid crystal molecules 312 and the liquid crystalline monomer to be aligned by the alignment layer 6 in the first orientation. The liquid crystalline monomer is an organic material with dielectric anisotropy and anisotropy in terms of wetting ability, such as having hydrophobic or hydrophilic property in different orientations. In an embodiment, the liquid crystalline monomer may be 4-(3-acryloyloxypropyloxy)-benzoic acid 2-methyl-1,4-phenylene ester.

In step 93, the liquid crystalline monomer is cured to form the polymer grains 313 and to cause a phase separation of the polymer grains 313 and the liquid crystal molecules 312 so as to permit liquid crystal molecules 312 to be retained by the polymer grains 313 in the first orientation (FIG. 2).

In step 94, the upper substrate 5 and the alignment layer 6 are removed to leave the liquid crystal/polymer composite film 3 on the electrode film units 2.

In an embodiment shown in FIGS. 2 and 3, each of the surface regions 311 has the hydrophobic property when the liquid crystal molecules 312 are in the first orientation (FIG. 2), and has the hydrophilic property when the liquid crystal molecules 312 are in the second orientation (FIG. 3). When the liquid crystal molecules 312 are in the second orientation, the water vapor in the ambient air is liable to be condensed into a smaller water droplet on the respective surface region 311. In an embodiment shown in FIG. 1, each of the electrode film units 2 has a width (W) ranging from 20 microns to 2 millimeters. With such arrangement of the electrode film units 2, the smaller water droplets on the surface regions 311 of the hydrophilic property are liable to aggregate into a larger water droplet 100. After the water droplet 100 aggregates to have a dimension of about 150 microns, some of the surface regions 311 may be switched to have the hydrophobic property so as to move the water droplet on the surface regions 311 toward a predetermined area (not shown) on the contact surface 31 for water collection.

The individual smaller water droplets may be so small that they may easily evaporate again. With the provision of the atmospheric water generator of the disclosure, the smaller water droplets are liable to aggregate into the larger water droplets 100 and can be easily moved on the contact surface 31 for collection. Therefore, the undesired evaporation of the water droplets can be alleviated so as to make water collation more effective.

Furthermore, since the energy applied to the liquid crystal molecules 312 for switching the wetting properties of the surface regions 311 is relatively low, the atmospheric water generator may be operated in a relatively energy-saving manner.

In addition, the atmospheric water generator may be applied in a dehumidifier for extracting water from the ambient air.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An atmospheric water generator for extracting water droplets from ambient air, comprising:

an insulating substrate having an upper surface which defines a plurality of electrode-forming regions that are displaced from each other, each of said electrode-forming regions having a first zone, a second zone spaced apart from said first zone, and an intermediate zone disposed between said first and second zones;

a plurality of electrode film units each of which is formed on a respective one of said electrode-forming regions, and each of which includes
      a first electrode having a first base portion which is formed on said respective first zone, and a plurality of first finger electrode portions which are formed on said respective intermediate zone, and which are displaced from each other, each of said first finger electrode portions extending from said first base portion toward said respective second zone,
      a second electrode which is electrically isolated from said first electrode, and which has a second base portion formed on said respective second zone, and a plurality of second finger electrode portions that are formed on said respective intermediate zone to alternate with said first finger electrode portions, each of said second finger electrode portions extending from said second base portion toward said first base portion;

a liquid crystal/polymer composite film disposed to cover said electrode film units, and having a contact surface for exposure to the ambient air, said contact surface having a plurality of surface regions each of which is in position corresponding to one of said electrode film units, and each of which has a plurality of liquid crystal molecules each having a hydrophilic functional group and a hydrophobic moiety such that each of said surface regions is permitted to have one of hydrophilic and hydrophobic properties when said liquid crystal molecules are retained by a plurality of polymer grains in a first orientation, and such that when a voltage is applied between said first and second electrodes of one of said electrode film units to generate a fringing field, said liquid crystal molecules of said respective surface region are orientated in a second orientation by said fringing field to permit said respective surface region to be switched to have the other one of the hydrophilic and hydrophobic properties, to thereby allow the water droplets condensed from the ambient air to move on said contact surface; and a cooling device disposed to cool said contact surface below a dew point of water so as to facilitate condensation of water vapor in the ambient air into the water droplets on at least one of said surface regions with the hydrophilic property.

2. The atmospheric water generator according to claim 1, wherein said hydrophilic function group is a cyanide group, and said hydrophobic moiety includes a phenyl moiety.

3. The atmospheric water generator according to claim 1, wherein each of said first and second finger electrode portions is configured as a zigzag stripe.

4. The atmospheric water generator according to claim 1, wherein said liquid crystal/polymer composite film is made by the steps of:
   (a) providing an upper substrate with an alignment layer with a predetermined pattern, the alignment layer being spaced apart from said electrode film units on said insulating substrate to define a filling space therebetween;
   (b) filling a mixture of said liquid crystal molecules and a liquid crystalline monomer in the filling space to permit said liquid crystal molecules and the liquid crystalline monomer to be aligned by the alignment layer in said first orientation;
   (c) curing the liquid crystalline monomer to form said polymer grains and to cause a phase separation of said polymer grains and said liquid crystal molecules so as to permit liquid crystal molecules to be retained by said polymer grains in said first orientation; and
   (d) removing the upper substrate and the alignment layer to leave said liquid crystal/polymer composite film on said electrode film units.

5. The atmospheric water generator according to claim 4, wherein said liquid crystal molecules are selected from the group consisting of 4-pentyl-4'-cyanobiphenyl, 4-heptyl-4'-cyanobiphenyl, 4-octyloxy-4'-cyanobiphenyl, 4-pentyl-4'-cyanoterphenyl, and combinations thereof.

6. The atmospheric water generator according to claim 5, wherein the liquid crystalline monomer includes 4-(3-acryloyloxypropyloxy)-benzoic acid 2-methyl-1,4-phenylene ester.

7. The atmospheric water generator according to claim 6, wherein each of said surface regions has the hydrophobic property when said liquid crystal molecules are in said first orientation, and has the hydrophilic property when said liquid crystal molecules are in said second orientation.

* * * * *